March 20, 1951  C. FIELD  2,546,092
METHOD AND APPARATUS FOR MANUFACTURING ICE
Filed May 16, 1945  3 Sheets-Sheet 1
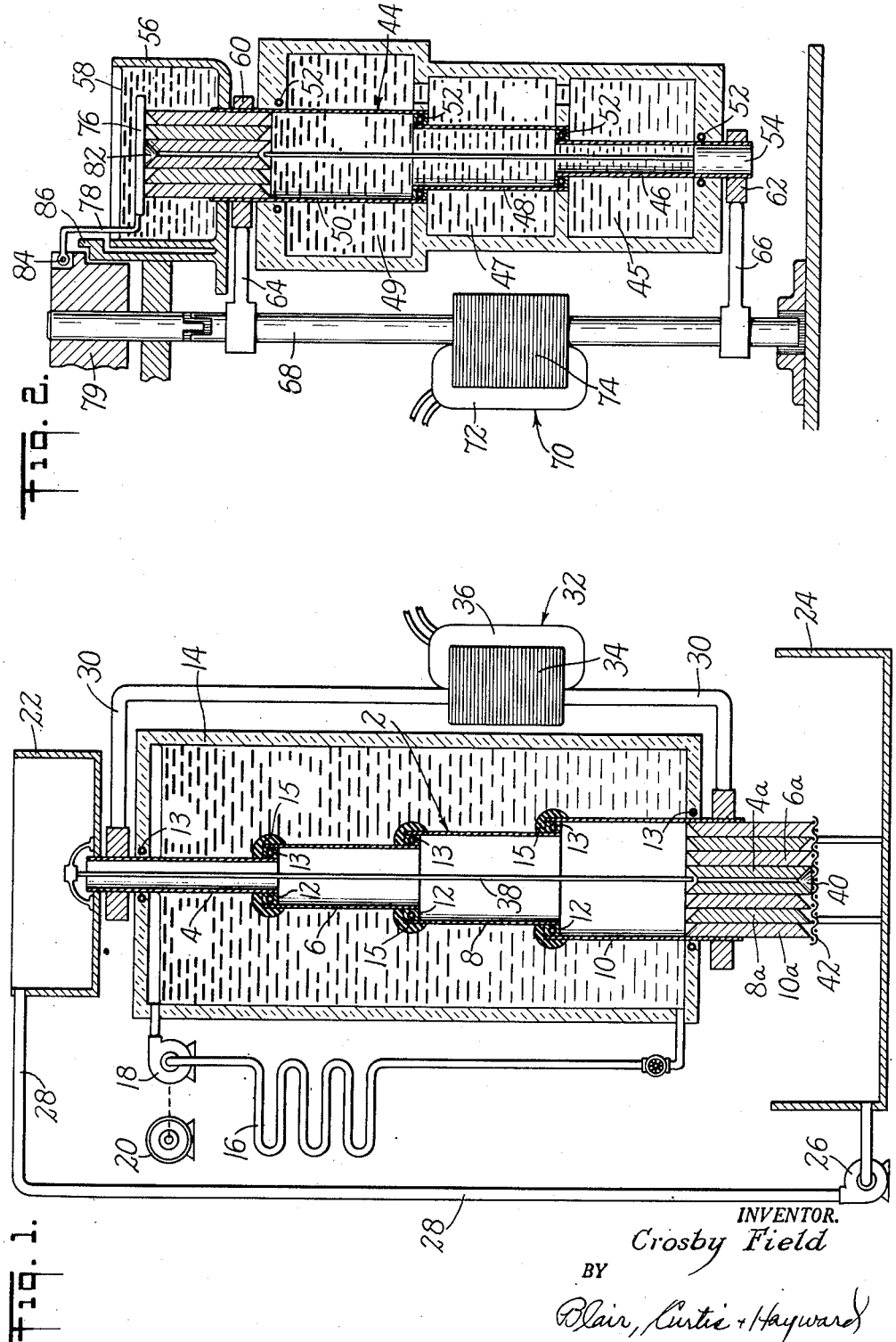
INVENTOR.
Crosby Field
BY
Blair, Curtis + Hayward
ATTORNEYS March 20, 1951 — C. FIELD — 2,546,092
METHOD AND APPARATUS FOR MANUFACTURING ICE
Filed May 16, 1945 — 3 Sheets-Sheet 2

INVENTOR.
Crosby Field
BY
Blair, Curtis & Hayward
ATTORNEYS

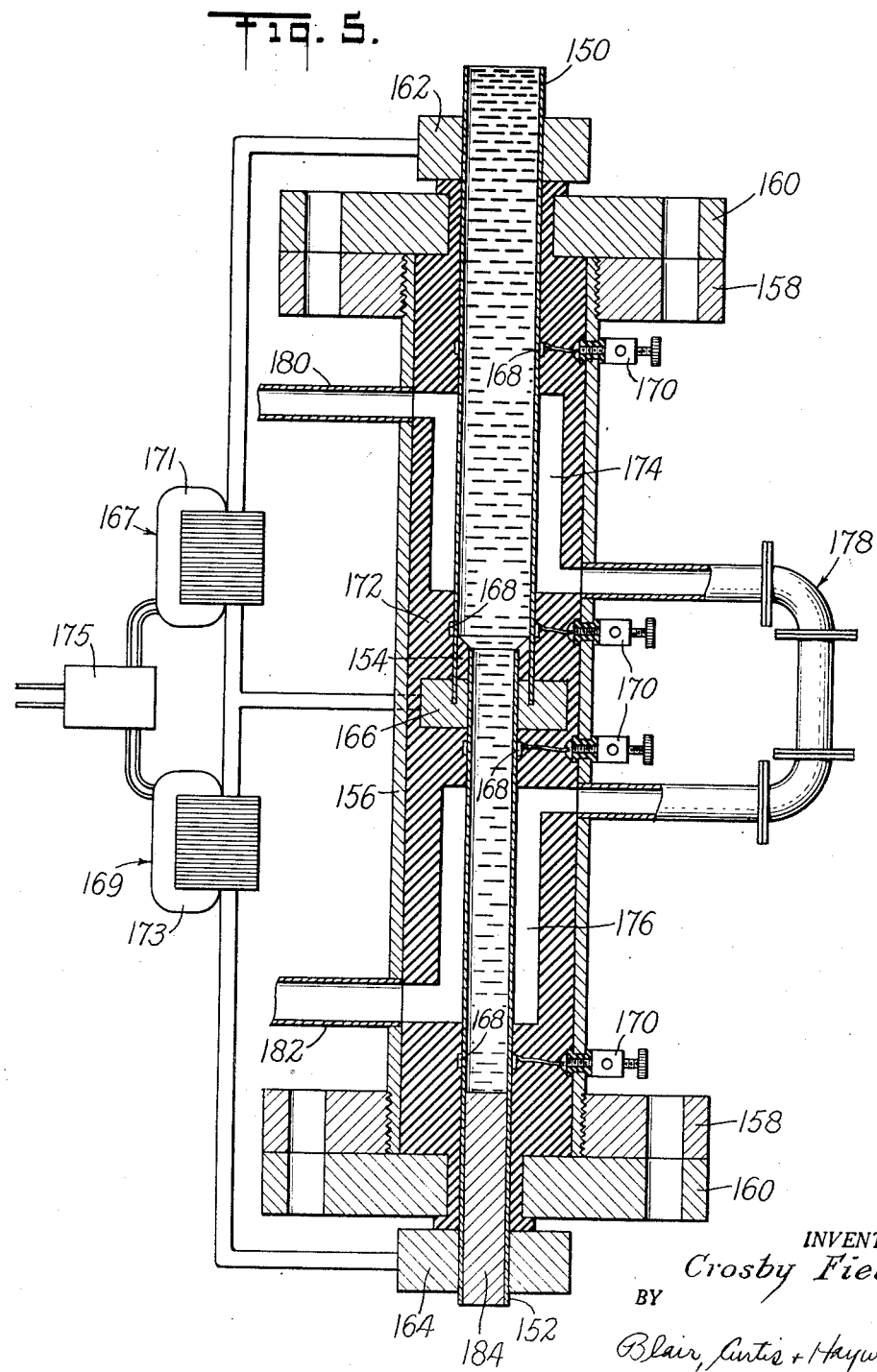

Patented Mar. 20, 1951

2,546,092

UNITED STATES PATENT OFFICE 2,546,092

METHOD AND APPARATUS FOR MANUFACTURING ICE

Crosby Field, Brooklyn, N. Y., assignor to Flakice Corporation, Brooklyn, N. Y., a corporation of Delaware Application May 16, 1945, Serial No. 593,983

16 Claims. (Cl. 62—172)

This invention relates to the congealing of liquids, and more in particular to a method and apparatus for freezing fluids, such as water, fruit juices, milk, cream, milk of magnesia, or the like, into solid or thick-walled bodies such as cylinders.

An object of this invention is to provide an efficient and dependable method and apparatus for congealing liquids in a minimum of time. A further object is to provide for the building up of relatively large bodies of ice from smaller bodies in a practical manner. A further object is to provide for the preservation by congelation of materials such as liquids and semi-solid foods in an efficient and dependable manner.

In the forming of ice from liquids or semi-solids on freezing surfaces, the first thin layer of ice is formed immediately, but the layer then becomes thicker at a rapidly decreasing rate. For example, under certain particular circumstances, when water ice is being frozen onto an immersed freezing surface which is maintained at a given temperature, the first one-eighth of an inch of ice may form in less than a minute, and the next layer of the same thickness may form within two minutes, but a layer of ice four inches thick may take as long as twenty hours. Water ice has been produced commercially in thin sheets, and in fact, certain apparatus which produces this type of ice has enjoyed considerable commercial success. This type of ice is in small pieces with air between them and is ideal for certain uses. This system of freezing is very rapid, which makes it economical in the use of the apparatus and in power consumption, and it is ideal for freezing certain liquid and semi-solid foods. That is, the foods are frozen without damage, and they are well preserved during storage, or when preferred they may be used immediately in their frozen condition.

However, under some circumstances, it is desirable to provide large pieces of ice which are either thick-walled or are solid in cross-section. For example, when fruit juices are being frozen, it is desirable to exclude air from them because exposure to air results in deterioration of the fruit juices and impairs the keeping qualities. Therefore, the freezing of fruit juices into small thin pieces is undesirable because of the extensive surface which is exposed to the air. Furthermore, when products are to be stored or shipped, it is desirable to pack them in a minimum of space, and the inclusion of air increases the volume of the frozen product. For certain uses of water ice it is desirable to provide relatively large pieces; for example, with certain types of refrigerator cars and iceboxes, the ice chamber is of such a nature that fragments of ice are unsatisfactory.

It is an object of the present invention to provide a method and apparatus which has the advantage of fast freezing and yet which makes it possible to produce relatively large pieces of ice. The term "ice" as used herein refers to congealed liquids in general, and more in particular to congealed products such as fruit juices, etc., which have water as their main constituent. The term "cylinder" as used herein refers to any type of body having a surface of revolution about an axis, and may be a cube of ice, and more in particular to such a body which is circular in cross-section whether solid or hollow.

In accordance with the present invention, ice is formed in thin layers upon two or more adjacent freezing surfaces, and the ice is quickly removed from the freezing surfaces and the layers are immediately moved together face-to-face, or "nested." The removal of the ice from the freezing surface and the positioning of the pieces face-to-face is so rapid that the central portions of the ice bodies are still sub-cooled with the result that regelation takes place, thus bonding the adjacent surfaces of the ice layers and forming a single body of ice. The surface of the ice which has been in direct contact with the freezing surface is greatly sub-cooled, whereas the surface in contact with the liquid is sub-cooled very little, if any, because the sub-cooling comes from the transfer of heat from this surface into the ice. When the pieces are detached, the ice surface which has been in contact with the freezing surface takes on heat rapidly from its newly acquired liquid film, and this continues after the pieces of ice have been moved face-to-face and until the single body of ice is formed.

Illustratively, a number of cylinders of ice of different sizes are formed, the sizes of the cylinders and the wall thicknesses being such that the cylinders fit together with small clearances between the outer surface of each inside cylinder and the inside surface of the cylinder surrounding it. The cylinders are removed from their respective freezing surfaces simultaneously or in predetermined timed relationship, and they are moved to a nested position, one within another so that after the regelation, a substantially solid cylinder of ice is obtained. Each cylinder of ice has its two ends so tapered that the cylinder which enters it is automatically guided into place, and yet the outer surface of the outer cylinder is a true cylinder so that the resulting piece of ice may be readily packaged and packed. In the discussion of the illustrative embodiments of the invention reference is made to the nesting of the ice cylinders and it should be noted that much of this discussion also applies to the placing in face-to-face relationship of sets of ice, of shapes other than cylindrical.

When desirable, the solid cylinder of ice may be refrozen in a mold with the interstices at the ends and in the center filled with unfrozen liquid so that straight ends are provided on the solid frozen cylinder. By forming ice in this manner, a cylinder of any desired size or a wall of any desired thickness may be provided, it being understood that the number of cylindrical shells which are regelated together and the wall thicknesses of the individual shells are factors which may be varied in accordance with the particular conditions and demands in use.

In the illustrative embodiments of the present invention, the system is similar to the systems disclosed in my copending applications, Serial No. 538,768, filed June 5, 1944, (issued as Patent No. 2,488,529 on November 22, 1949), and Serial No. 586,738, filed April 5, 1945. For certain details of construction and operation reference may be had to these copending applications.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the drawings:

Figure 1 is a partially schematic showing of apparatus incorporating the present invention;

Figure 2 is a view similar to Figure 1 showing one freezing tube of another embodiment of the invention;

Figure 5 is a sectional view of the freezing tube of another embodiment of the invention.

Figure 3:
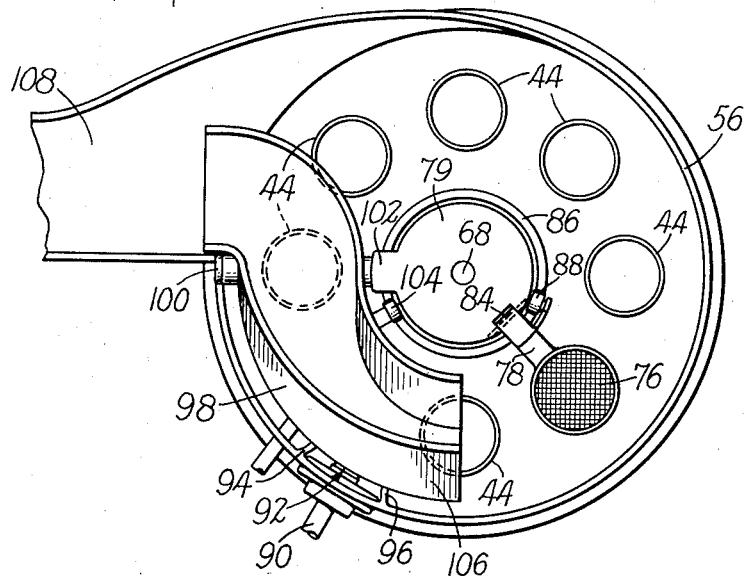
Figure 3 is a top-plan view of the embodiment of Figure 2.

Referring particularly to Figure 1, a freezing tube 2 is formed by four tube sections 4, 6, 8 and 10 of different diameters but of substantially the same length. The tube sections are joined together at their respective ends by metal rings 12 welded to the end surfaces of the tube sections. Imbedded in each ring 12 is a heating coil 13, and each ring 12 is enclosed in a heat-insulating rubber ring 15. Freezing tube 2 is surrounded by an evaporator 14 which is of the flooded type and receives liquid refrigerant from a condenser 16, and the gas refrigerant is withdrawn and compressed by a compressor 18 driven by an electric motor 20. At the top, freezing tube 2 is open to a pan 22 from which the liquid to be congealed flows down the inner walls of the freezing tube where it is frozen. The liquid supplied to the freezing tube which is in excess of that frozen flows from the bottom of the freezing tube into the bottom of a sump tank 24 and is returned by a motor-driven pump 26 and a pipe 28 to pan 22.

The ice from freezing tube 2 is harvested in a manner disclosed in my above-identified copending applications; that is, the freezing tube is subjected to a sudden electrical shock of sufficient magnitude to free the ice. Thus, the upper and lower ends of the freezing tube are connected to a copper bus bar 30 which forms with the freezing tube the secondary winding of a transformer 32. Transformer 32 has an iron core 34 and a primary winding 36 to which a source of A. C. voltage is connected by closing a switch. When primary winding 36 is so energized, a current of very high value such as one thousand amperes flows through the secondary winding formed by bus bar 30 and the freezing tube 2. This sudden flow of current immediately frees the ice cylinders within the tube all in a manner discussed more fully below.

Normally the apparatus is operated in accordance with a timed cycle by a timer not shown. The liquid to be congealed is pumped into pan 22 by pump 26 and flows down the inside walls of freezing tube 2. The refrigerating effect causes thin layers of ice in the form of cylinders to form within the tube sections 4, 6, 8 and 10, and heating oils 13 limit the axial extent of the cylinders at their ends and also cause the cylinders to have interior tapers at their ends. After ice layers of a desired thickness have formed, the current is turned on to winding 36 so that the secondary winding current flows through the freezing tube and the ice cylinders are freed.

Extending down the axis of the freezing tube and supported from the top is a plastic rod 38, and in alignment with the lower end of rod 38 is a small cone 40 supported on a removable screen 42. Screen 42 closes the lower end of the freezing tube, and as the various cylinders of ice are freed they fall onto the screen, the arrangement being such that the cylinders automatically rest one within another as shown. That is, as the outer cylinder 10a from tube section 10 falls down, it is of such thickness that it snugly receives the cylinder 8a from tube section 8, the nesting being facilitated by the interior taper on cylinder 10a. At the same time, the smallest cylinder 4a from tube section 4 slides down rod 38 and due to the inner taper on its lower end, it stands on end on cone 40, and the cylinder 6a from tube section 6 falls down and is guided in between cylinders 4a and 8a. This freeing and nesting operation is carried on with such rapidity that the ice cylinders are still sub-cooled when they have become nested, and they automatically regelate into a solid body of ice. After the ice has been freed from the freezing tube, the current is turned off from winding 36 and screen 42 is automatically moved down to discharge the regelated ice cylinder. A new freezing cycle immediately starts.

In the embodiment of Figures 2 and 3, seven freezing tubes 44 (see Figure 2) of the flooded type are provided, and each is built up in three pipe sections 46, 48 and 50, which pipe sections have individual interconnected evaporator chambers 45, 47 and 49 surrounding them. Each tube section provides a freezing zone which is limited by heating coils 52 surrounding the freezing tubes and embedded in the refrigerant chamber walls at the ends of the tube sections. The lower end of the freezing tube is closed by a plug 54, and the upper end opens into an annular tank 56 which has a liquid level indicated at 58.

Referring to Figure 3, the seven freezing tubes 44 are positioned in an annular bank, and the harvesting operation is carried on in a manner similar to that disclosed in my copending application Serial No. 586,738. Accordingly, near the upper end of each freezing tube 44 (Figure 2) and beneath tank 56 is a copper segment 60 and similarly at the bottom of the freezing tube is a segment 62. These segments are brazed to the tube walls and are adapted to be engaged respectively by a pair of distributor arms 64 and 66 which are rigidly carried by a rotatable copper shaft 68. Shaft 68 forms with the freezing tube the secondary winding of a transformer 70 which has a primary winding 72 and an iron core 74. When current is supplied to the primary winding 72, a current of high value flows through the secondary circuit for freeing the ice as in the embodiment of Figure 1.

At the top of the freezing tube, and in alignment therewith during the harvesting operation, is a perforated plate 76 which is carried by an arm 78 hinged at 84 to a head 79 carried by and keyed to the top of shaft 68. Thus, when the harvesting current is turned on and the cylinders of ice in the pipe sections are freed, the cylinders float toward the surface of the water into engagement with plate 76, as shown; the ice cylinders are held in place because they only partially emerge from the upper end of the freezing tube. The inner taper on each end of each of the cylinders facilitates the nesting of the cylinders one within another and causes the smallest cylinder to center itself on a downwardly projecting cone 82 carried by plate 76. As in the embodiment of Figure 1, the freeing and nesting operations are completed in such a short time that the cylinders are still sub-cooled at the time the cylinders come to rest in nested position. Thus, regelation takes place, and the nested cylinders are formed into a solid ice body. Immediately thereafter, shaft 68 is rotated sufficiently to move plate 76 from over the freezing tube, and the body of ice floats to the surface of the liquid in tank 56.

As disclosed more fully in my copending application, Serial No. 586,738, tank 56 (Figure 3) is supplied with liquid to be congealed through a pipe 90 controlled by a float valve assembly, indicated at 92 (but only the valve of which is shown) which is positioned between a pair of radial partitions 94 and 96 extending radially across tank 56. There is no freezing tube beneath the float valve, and these partitions act to limit movement of the ice bodies around the tank. Surrounding the lower portion of head 79 is an annular cam surface 86 upon which rides a roller 88 carried by arm 78. Thus, the arm and plate 44 are supported with the plate held in a horizontal position as shown in Figure 2. As shaft 68 rotates step-by-step in a counterclockwise direction so that the harvesting operation is carried on on the various freezing tubes, head 79 also rotates carrying with it arm 78 and plate 44. Thus, plate 76 also moves around from one tube to the next and is supported on cam surface 86 by roller 88. However, the weight of plate 76 is sufficient to overcome the tendency of the ice cylinders to lift it, and the ice cylinders are therefore held in their nesting position until the plate is moved to the next freezing tube. At the proper place with respect to partitions 94 and 96, cam surface 86 has a rise in it to cause roller 88 to ride up and lift plate 76 over the partitions.

The ice is removed from tank 56 by a combined pushing and dumping scoop 98 which is structurally of the type disclosed in my copending application, Serial No. 586,738. Scoop 98 is rockably carried by a stud shaft 100 extending from an overhanging bracket 102 on head 79. Scoop 98 is shown in the ice-dumping position, but when in the ice-scooping position, the forward end 106 of the scoop is lowered beneath the level of liquid in tank 56. The trailing end of this scoop extends out over the side of tank 56 so that ice bodies which are gathered by the forward end of the scoop are discharged over the side of the tank. Scoop 98 carries a roller 104 which rides on cam surface 86 the same as does roller 88 to lift the forward end of the scoop over partitions 94 and 96.

In Figure 3, scoop 98 is shown at the end of the dumping operation, and as head 79 rotates counterclockwise from the position shown, roller 104 rides down on cam surface 86, and the forward end of the scoop is immersed in the liquid in the tank. Thereafter the scoop moves around the tank gathering the ice bodies and pushing them ahead of it around toward partition 94. As the forward end of the scoop approaches partition 94, the ice bodies are pushed together and some of them slide up the scoop and may even fall over the side of the tank. However, at the side of the tank is a stationary chute 108 into which the ice bodies fall, and as the forward end of the scoop approaches partition 94, this forward end is lifted and the ice bodies are all dumped into chute 108, thus, completing the cycle.

Figure 4:
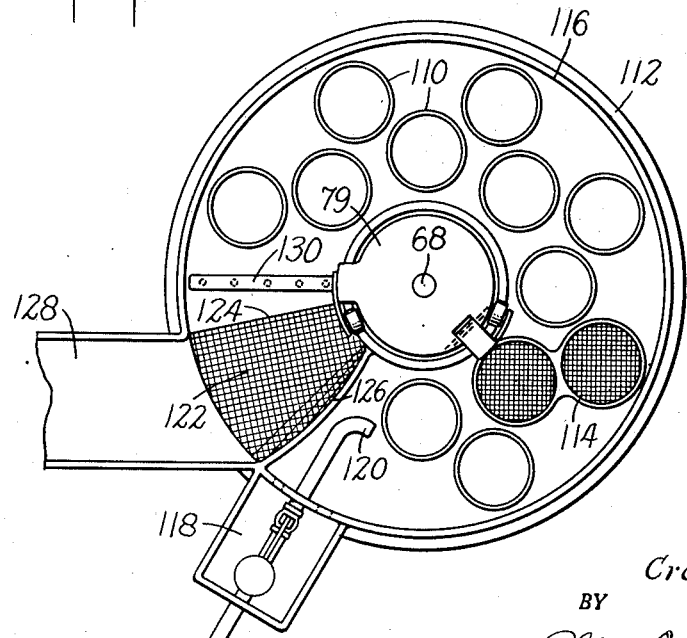
Figure 4 is a partially schematic view similar to Figure 3 showing another embodiment of the invention.

In the embodiment of Figure 4, two cylindrical banks of flooded freezing tubes 110 are enclosed in a casing 112, and they open at their tops into a tank 116. Freezing tubes 110 are of the type of tube 44 in Figures 2 and 3, except that two tubes 110 are harvested simultaneously. Accordingly, a plate 114 is provided which at all times covers the two tubes being harvested, and this plate is similar to plate 76 and is mounted on a head 79 in the same way. The level of the liquid to be frozen in tank 116 is maintained by a float valve in a float chamber 118 at the left of tank 116. The liquid from the float valve enters tank 116 through a jet 120 which is directed counterclockwise around the tank. Thus, the liquid entering tank 116 tends to cause a counterclockwise circulation of the liquid and floating ice bodies.

Adjacent the liquid inlet jet 120 is a slanting screen 122, which is in contact with the bottom of the tank along a radial line 124 and which projects above the top of the tank at 126. Adjacent screen 122 and at the side of tank 116 is a chute 128. Hinged to head 79 in the same manner as is plate 114 is a rake 130 which has a top horizontal member and a plurality of downwardly projecting prongs which extend into the liquid and near the bottom of tank 116. These prongs are so spaced that, as the rake is moved around in trailing relationship to plate 114, the ice bodies are moved ahead of the rake. As plate 114 approaches screen 122, it is lifted over the screen by a roller and cam arrangement the same as is plate 76 in Figure 3. When rake 130 approaches screen 122, it pushes the ice bodies up the screen, and they are deflected by the screen over the side of tank 116 and into chute 128. The rake is also lifted in the same manner as is plate 114 so that it moves over the top of the screen and down into the tank again. The moving of the ice bodies around to and up screen 122 is aided by the liquid circulation caused by jet 120, and the effect of this jet may be sufficient to move some ice bodies from the tank into chute 128.

In the embodiment of Figure 5, the freezing tube is flooded as in the embodiment of Figures 2 and 3, and the ice is floated to the surface of the water. The tube has two freezing sections, there being a large upper section 150 and a small lower section 152, the adjacent ends of which are telescoped and bonded together by a rubber ring 154. The two tubes are substantially enclosed in a steel cylinder 156, with the tube sections extending beyond the cylinder at the ends. The tube and cylinder are rigidly mounted at the top and bottom respectively by a pair of flanges each formed by a flange member 158 threaded onto the end of cylinder 156 and a flange member 160 enclosing the end of the freezing tube and fitting over the end of the cylinder. A plurality of bolts, not shown, extend through holes in the flanges to clamp the flange members together and to attach them to a suitable rigid support.

Brazed to the supper end of tube 150 is a copper conducting block 162 and similarly attached to the lower end of tube 152 is a similar block 164. At the juncture of the two freezing tubes is a third conductor block 166, which has an annular recess in which the lower end of tube 150 is imbedded, and the block is brazed to both freezing tubes. Two transformers 167 and 169 are provided which are of the type of transformer 32 in Figure 1, transformer 167 having its secondary 171 connected between blocks 162 and 166, and transformer 169 having its secondary 173 connected between blocks 166 and 164. The primary windings of these transformers are supplied with current through a timer 175, and the transformers are energized separately so that the ice is freed independently from the two freezing tube sections.

Four heating coils 168 encircle the freezing tube sections at the two ends of the freezing zones; and current is supplied to each of these heating coils continuously through a terminal 170 and another terminal (not shown). The major portion of the space within cylinder 156 is occupied by rubber, either natural or synthetic, indicated at 172. This rubber forms packing seals at flange members 160 and forms at the upper freezing tube section an evaporator section 174, and similarly at freezing tube 152, an evaporator section 176. The two evaporator sections are connected by a refrigerant conduit 178. Liquid refrigerant is supplied to the upper end of evaporator section 174 through a pipe 180 and gas refrigerant is withdrawn at the bottom of evaporator section 176 through a pipe 182. A tank (not shown) is provided at the top to which the upper end of the freezing tube is open. The lower end of the freezing tube is closed by a plug 184.

The freezing and ice harvesting cycle is similar to that of the other embodiments. With the tube filled with the liquid to be congealed, refrigerant is supplied to the evaporator sections so that cylindrical ice bodies are formed in the two freezing tube sections. After a predetermined time, transformer 169, which is connected between conducting blocks 164 and 166, is turned on so that the ice body is freed from freezing tube section 152. As this ice body starts to float to the top, it enters the ice body in the upper freezing tube section 150. Then, transformer 167, which is connected between contact blocks 162 and 166, is turned on, and the timing is such that the larger ice body in freezing tube section 150 is freed shortly after the smaller ice body enters the larger ice body. Thus, the larger ice body starts to move up with the smaller ice body within it and the regelation action takes place at once. When desirable, means is provided to stop the upward movement of the ice bodies before they emerge completely from the freezing tube so that the ice bodies are held stationary in alignment during the regelation into a single ice body.

As many possible embodiments may be made of the mechanical features of the above invention and as the method herein described might be varied in various parts, all without departing from the scope of the invention, it is to be understood that all matter hereinabove set forth, or shown in the accompanying drawings is to be interpreted as illustrative and not in a limiting sense.

I claim:

1. In the art of congealing liquids, the steps of, congealing a plurality of similarly shaped thin bodies at a temperature below the congealing temperature, supplying heat to the congealing surfaces at the edges of the thin bodies thereby to limit the sizes of the thin bodies, freeing the thin bodies and moving the thin bodies into face-to-face contact relationship by the action of gravity with the interstices between the thin bodies filled with the liquid while maintaining the internal portions of the thin bodies in a subcooled condition, whereby the thin bodies regelate together by congealing the liquid between the thin bodies by virtue of the internal sub-cooled condition of the thin bodies.

2. In the art of forming a cylinder of a congealed liquid, the steps of, flooding a plurality of cylindrical surfaces which are of different diameters and are positioned vertically end-to-end, congealing on said surfaces a plurality of thin-walled cylinders of such different sizes that they will fit one within another with a thin liquid layer between the mating surfaces, and positioning the cylinders one within another to permit regelating action which congeals the liquid between the mating surfaces and forms a solid body.

3. In the art of forming a solid body of ice, the steps of, congealing a plurality of bodies which are adapted to fit together with mating surfaces which are substantially parallel, controlling the longitudinal extent of the bodies, freeing the individual bodies, and moving them into adjacent relationship with their mating surfaces together and with the interstices between the mating surfaces substantially filled with liquid, said freeing and moving operations being at such speed that the bodies regelate together by virtue of the sub-cooled condition of the bodies.

4. In apparatus of the character described, the combination of, congealing means to produce a plurality of congealed bodies which are adapted to fit together in face-to-face relationship, means to supply heat to the congealing surfaces at the edges of said bodies whereby the extent of said bodies is controlled, and means to free the bodies and with the parts being so constructed and arranged as to position the bodies into face-to-face relationship at a rapid rate whereby the bodies regelate together.

5. Apparatus of the character described, comprising a plurality of tube sections of different diameters adapted to produce cylinders of congealed liquid which will nest one within another, means to supply liquid to be congealed to said tube, means to cool the liquid and form cylindrical bodies within the tube, heating means to limit the lengths of said cylindrical bodies, and means to free the ice bodies, with the parts being so constructed and arranged as to move the ice bodies into nested position with sufficient speed to obtain the regelation of the ice bodies into a single ice body.

6. In apparatus of the character described, the combination of, a cylindrical bank of freezing tubes each of which is a continuous tube having different diameters at its ends and is adapted to form a plurality of ice bodies of different sizes which are adapted to nest together, means to free the ice bodies, and means to direct the ice bodies into nested relationship with sufficient speed to permit regelation between the ice bodies into a single piece of ice.

7. A freezing tube comprising, a plurality of tube sections of different diameters positioned in end-to-end relationship, means connecting the tubes together at their adjacent ends, and a plurality of heating units circling each end of each tube whereby the ends of the tubes may be heated continuously while the central portion of each tube is cooled to form ice therein.

8. In apparatus of the character described, the combination of, a freezing tube comprising a plurality of tube sections of different diameters positioned vertically in end-to-end relationship, means to maintain said tube flooded with liquid to be congealed, means to refrigerate the tube to form individual ice cylinders within the various tube sections, and means to free the ice comprising transformer means to supply electrical currents individually to the various tube sections whereby the ice bodies are floated to the top of the tube in nested relationship.

9. Apparatus as described in claim 8 wherein the transformer means is a plurality of transformers corresponding in number to the number of said tube sections, and a timer to regulate by a predetermined sequence the supplying of current to the various tube sections.

10. In the art of congealing ice bodies, the steps of, forming a plurality of ice cylinders of different diameters such that they will nest one within another, freeing the smallest ice body and utilizing gravity to move it into nested position within another, and freeing the ice body in which it is nested in timed relationship such that the two bodies will be moved together.

11. In apparatus for forming congealed composite bodies, the combination of, a congealing tube formed by a plurality of tube sections positioned in fixed end-to-end relationship with the largest tube section presenting a congealing surface which is substantially the diameter desired in the composite bodies to be formed and with each of the other tube sections presenting congealing surfaces of such diameter that a body formed thereon will nest within the body formed on the next larger adjacent tube section, means to supply liquid to the various congealing surfaces, means to simultaneously cool said surfaces whereby bodies are formed thereon, means to impart heat to the tube sections at the ends thereof thereby to limit the lengths of the respective bodies, and means to produce sudden heating effects in the various tube sections thereby to free the bodies.

12. Apparatus as described in claim 11 wherein the bodies are moved from their respective surfaces upon which they are formed by the action of gravity and are nested one within another with sufficient rapidity that they regelate together due to the sub-cooled condition of the interiors of the bodies.

13. In apparatus for forming congealed composite bodies, the combination of, a congealing tube formed by a plurality of tube sections vertically positioned in fixed end-to-end relationship with the largest tube section being uppermost and presenting a congealing surface which is substantially the diameter desired in the composite bodies to be formed and with each of the other tube sections presenting surfaces of such diameter that a body formed thereon will nest within the body formed on the next adjacent tube section, means to flood the various surfaces with the liquid to be congealed, means to cool said surfaces whereby bodies are formed thereon, means to impart heat to the tube sections at the ends thereof thereby to limit the lengths of the bodies, and harvesting means to produce sudden heating effects in the various tube sections thereby to free the bodies.

14. Apparatus as described in claim 13 wherein the said harvesting means heats the tube sections individually, and sequential control means to control the freeing of the bodies whereby the lowermost body is freed first and it floats upwardly within the next higher body which is then freed and the two bodies float upwardly together.

15. Apparatus as described in claim 13 which includes, a rod projecting upwardly through said tube, and means positioned beneath the surface of the liquid to stop the bodies in their upward movement.

16. In apparatus for congealing composite bodies, the combination of, a congealing tube formed by a plurality of tube sections vertically positioned in fixed end-to-end relationship with the largest tube section lowermost and presenting an inner surface which is substantially the diameter desired in the composite bodies to be formed and with each of the other tube sections presenting surfaces of such diameter that a body formed thereon will nest within the body formed on the next adjacent lower tube section, means to flow a stream of liquid down the various congealing surfaces, means to cool said surfaces whereby bodies are formed thereon, means to produce sudden heating effects in the various tube sections thereby to free the bodies, and means to collect the various bodies in nested relationship automatically at the bottom of the tube.

CROSBY FIELD.

REFERENCES CITED

The following references are of record in the file of this patent:

UNITED STATES PATENTS

| Number | Name | Date |
|---|---|---|
| 275,192 | Goodell | Apr. 3, 1883 |

FOREIGN PATENTS

| Number | Country | Date |
|---|---|---|
| 2,357 | Great Britain | July 27, 1868 |
| 14,925 | Great Britain | Nov. 2, 1887 |